UNITED STATES PATENT OFFICE 2,686,207

DIFLUORO COMPOUNDS

Grant Crane and William S. Barnhart, Akron, Ohio, assignors to The Firestone Tire & Rubber Company, Akron, Ohio, a corporation of Ohio No Drawing. Application December 31, 1949, Serial No. 136,425

6 Claims. (Cl. 260—653)

The difluoro compounds of this invention are preferably obtained by dehydrohalogenation of adducts formed from (1) bromochlorodifluoromethane or dibromodifluoromethane and (2) an olefin or a chloro-olefin. The more important products are 1,1-difluoro-1,3-diolefins. Adducts may be formed from ethylene and dehydrogenated according to the following equations:

$$CH_2=CH_2 + BrXCF_2 \rightarrow BrCH_2-CH_2-CF_2X$$

$$BrCH_2-CH_2-CF_2X \rightarrow CH_2=CH-CF_2X (+HBr)$$

With adducts obtained from longer chain olefins (or chloro-olefins which contain more than two carbons), diolefins are obtainable according to the reactions illustrated by the following equations, in which X stands for either bromine or chlorine; R and R' are hydrogen, alkyl or chloroalkyl; and —CH$_2$R' contains at least as many carbons as R but not more than twelve.

$$RCH=CHCH_2R' + BrXCF_2 \rightarrow$$
$$XCF_2-CHR-CHBr-CH_2R'$$

$$XCF_2-CHR-CHBr-CH_2R' \rightarrow$$
$$CF_2=CR-CH=CHR' + (HX+HBr)$$

If a chlorohydrocarbon is used in forming the adduct, the dehydrohalogenation product may have more than two double bonds, and if the dehydrohalogenation is not carried to completion the double bonds in the final product may not be in the 1- and 3-positions. Any method of dehydrohalogenation may be employed. Regardless of the process, if there be a bromine substituent present, it will be removed at the start of the dehydrohalogenation, and if only this be removed an unsaturated chlorohydrocarbon results.

The 1,3-diolefins may be polymerized into rubbery polymers.

Diolefins are prepared by dehydrohalogenating an adduct produced from an olefin and either bromochlorodifluoromethane or dibromodifluoromethane in accordance with either of the reactions indicated below:

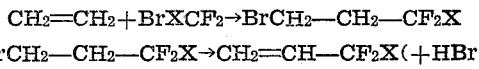

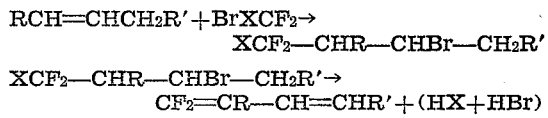

in which X is chlorine or bromine, R and R' are each hydrogen or alkyl, and CH$_2$R' contains at least as many carbons as R but no more than twelve.

The olefins and chloro-olefins which may be used in producing the adduct include, for example, the following:

| | |
|---|---|
| Ethylene | Biallyl |
| Propylene | Cyclohexene |
| Isobutylene | Cyclopentene |
| 1-butene | Allyl chloride |
| 2-butene | Crotyl chloride |
| Pentene | 1,4-dichloro-2-butene |
| Isopentene | 3-chlorocyclopentene |
| Hexene | Methallyl chloride |
| Isohexene | Octadecene-9 |
| Octene | Heneicosene-9 |
| Diisobutylene | Heptacosene-13 |
| Decene | |

Dibromodifluoromethane is a known compound. Bromochlorodifluoromethane may be produced by reacting a mixture of 25 per cent to 45 per cent of chlorodifluoromethane with from 75 per cent to 55 per cent of bromine (all percentages being on the basis of the total weight of chlorodifluoromethane and bromine) at temperatures between 300° C. and 1000° C. The bromochlorodifluoromethane may be separated by distillation from the resultant reaction mixture, and has a density of about 1.9 and a boiling point of about 0° C. at atmospheric pressure.

Although the dehydrohalogenation to compound IV may be effected by acid catalysis through compound II, the preferred process consists of an alkaline dehydrohalogenation to compound III and then acid catalysis to compound IV. In this preferred process an allylic rearrangement apparently takes place, probably during the acid catalysis. In either acid catalysis any of the usual acid catalysts may be used including, for example, zinc chloride, zinc bromide, ferric chloride, zinc sulfate, antimony chlorides, other salts of strong acids and weak bases, phosphotungstic acid, phosphomolybdic acid, etc. For the alkaline dehydrohalogenation any of the usual alkaline dehydrohalogenating agents may be used, including, for example, sodium hydroxide, potassium hydroxide, other alkali metal hydroxides, alkaline earth metal hydroxides, lime, organic bases, etc. An inert solvent, such as an etherified polyglycol, is preferably used in the alkaline dehydrohalogenation.

In the alkaline dehydrohalogenation the reaction proceeds to a limited extent to compound IV, but the process is preferably carried out in two steps, viz., alkaline dehydrohalogenation followed by catalytic acid dehydrohalogenation.

The dehydrohalogenation of adducts produced from chloro-olefins is generally similar, except that on removal of the chlorine originally present in the chloro-olefin, a double bond is formed at some other position than in the 1- and 3-positions.

The following examples illustrate the process. Each example starts with the production of an adduct. Various dehydrohalogenation procedures are described.

EXAMPLE 1

1,1-difluoroisoprene

*Addition of $CF_2BrCl$ to 2-butene.*—The nickel liner for a steel bomb of 1220 cc. capacity was chilled to the temperature of frozen carbon dioxide and charged with 125 g. (0.75 mole) of $CF_2BrCl$, 66 cc. of liquid 2-butene at $-78°$ C. (calcd. 0.75 mole) and 14 cc. of 29 per cent acetyl peroxide in dimethyl phthalate. The liner was inserted into the bomb, which was shaken 24 hours at 60°. Distillation of the product yielded 26.3 g. (18.3%) of 3-bromo-1-chloro-1,1-difluoro-2-methylbutane. The center cut had the following constants: $b_{30}=56-7°$, $n_D^{25}=1.4292$, $d^{20}=1.512$. Molecular refraction was 38.0 (observed), 37.7 (calculated).

*Purification of 3-bromo-1-chloro-1,1-difluoro-2-methylbutane.*—The crude adduct was washed with concentrated sulfuric acid, water, dilute sodium bicarbonate solution, dried over anhydrous magnesium sulfate and distilled at atmospheric pressure. The properties obtained are $$b_{736}=140-1°,\ n_D^{25}=1.4299,\ d^{25}=1.508$$

Molecular refraction was 38.0 (observed), 37.7 (calculated). The disagreeable odor of the crude product was completely eliminated by the purification.

*Discussion.*—The dehydrohalogenation must apparently be carried out in two steps:

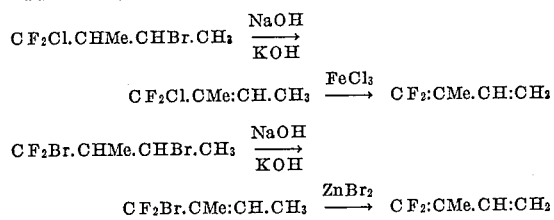

Alkaline agents tend to remove bromine as hydrogen bromide from the 3-position. Acidic salts tend to remove chlorine or bromine from the $CF_2Cl$ or $CF_2Br$ group. Neither type of reagent alone, under the conditions employed, produces any appreciable amount of diene from the saturated compound.

The chlorine atom in the $CF_2Cl$ group is more difficult to remove than chlorine from the $CCl_3$ group. Zinc chloride or bromide is a satisfactory catalyst in the latter case and ferric chloride causes a violent reaction. Ferric chloride in the case of the $CF_2Cl$ group acts slowly. The relative ease of removal of bromine from the $CF_2Br$ group is demonstrated by the fact that $ZnBr_2$ is a satisfactory catalyst. Ferric chloride causes a violent reaction.

*Dehydrobromination of 3-bromo-1-chloro-1,1-difluoro-2-methylbutane.*—The apparatus consisted of a 250-cc. three-neck flask fitted with a glass stirrer, a dropping funnel and a short distillation column. The distillate was collected by means of traps cooled with ice-water and frozen carbon dioxide in series.

A mixture of 50 cc. of dimethoxytetraglycol and 18.4 g. of 85 per cent potassium hydroxide was heated to its boiling point in the flask. A solution of 30.9 g. (0.14 mole) of 3-bromo-1-chloro-1,1-difluoro-2-methylbutane ($CF_2Cl.CHMe.CHBr.CH_3$)

and 15 cc. of dimethoxytetraglycol was added through the dropping funnel while heating and stirring. Heating and stirring were continued one hour. The ice-water trap contained water and an organic layer. The trap of frozen carbon dioxide contained about 1.5 cc. of liquid. The organic layer (lower) in the ice-water trap was separated, dried over anhydrous magnesium sulfate and distilled at atmospheric pressure. The following fractions were obtained:

| Fraction | B. P., degrees | Weight, g. | $n_D^{25}$ | $d^{25}$ |
|---|---|---|---|---|
| No. 1 | 60–82 | 1.0 | 1.3915 | |
| No. 2 | 82–6 | 2.2 | 1.3895 | |
| No. 3 | 86–7.5 | 5.5 | 1.3924 | 1.105 |
| No. 4 | 87.5–100 | 1.5 | 1.4090 | |
| Residue | | 6.0 | | |

Titration of an aliquot of the alkaline residue in the original reaction flask with standard silver nitrate indicated that 0.158 equivalents of halogen acid had been removed from 0.14 moles of starting material.

The molecular refraction of fraction No. 3 which was taken as $CF_2Cl.CMe:CH.CH_3$ (or perhaps $CF_2Cl.CHMe.CH:CH_2$) was 30.2 observed), 29.5 (calculated). The crude yield was 44 per cent.

*Dehydrochlorination of 1,1-difluoro-1-chloro-2-methyl-2-butene.*—The apparatus consisted of a 250-cc. three-neck flask fitted with a dropping funnel, a glass stirrer and a short distillation column. The vapors passing through the distillation column were passed over the surface of water to remove hydrogen halides and then through calcium chloride and soda lime traps. The final product was collected in a frozen-carbon-dioxide trap.

The various fractions of 1,1-difluoro-1-chloro-2-methyl-2-butene described above were combined and placed in the flask. Two grams of sublimed ferric chloride was added. Immediate evolution of hydrogen chloride gas took place. The flask was heated with stirring 1.5 hours, and 2 g. more ferric chloride was added in increments of about 0.5 g. A small amount of hydrofluoric acid was also evolved in the reaction. Tarry material formed in the reaction flask, and about 1.5 cc. of liquid collected in the trap. The liquid in the trap boiled at 38° C. and had $n_D^{21}=1.342$. Its density was slightly less than 1.0. These properties indicated that the product was 1,1-difluoroisoprene.

EXAMPLE 2

1,1-difluoroisoprene

*Addition of $CF_2Br_2$ to 2-butene.*—In this reaction there were used 209.8 g. (2 moles) of dibromodifluoromethane, 112 grams (2 moles) of butene-2, and 15 ml. of a 30 per cent solution of acetyl peroxide in dimethyl phthalate. The dibromodifluoromethane and butene-2 were charged in an autoclave at $-20°$ C. The acetyl peroxide solution was added, and the autoclave closed up and heated for 22 hours at 60° C. At the end of this time the unreacted gases were bled off from the autoclave into a trap maintained at $-70°$ C. The liquid remaining in the autoclave amounted to 219 grams, and was subjected to fractional distillation at 50 mm. The product coming over in the range 77–79° C. was substantially pure 1,3-dibromo-1,1-difluoro-2-methylbutane, and amounted to 161 grams (0.6 mole). On this basis, the conversion was 67 per cent and the yield was 30 per cent. The compound 1,3-dibromo-1,1-difluoro-2-methylbutane obtained has the following properties: $n_D^{20}=1.4588$; $d^{24}=1.786$; molecular refractivity: 40.6 (calculated, 40.7 (found); bromine: 60.2% (calculated), 60.7% (found); fluorine: 14.3% (calculated), 14.7% (found).

*Dehydrobromination of 1,3 - dibromo-1,1-difluoro - 2 - methylbutane.*—Twenty grams (0.5 mole) of sodium hydroxide was dispersed in a solution of 100 ml. of dimethoxytetraglycol and 10 ml. of water by heating and stirring. The alkali solution was added dropwise to 133 g. (0.5 mole) of 1,3 - dibromo-1,1-difluoro-2-methylbutane below 25° C. After standing overnight, the product was poured into water and separated. Fractionation gave 44 g. of starting material and 44 g. of a new compound for a yield of 80 per cent and a conversion of 33 per cent. This compound distilled at 103–5° C. with some decomposition and had an $n_D^{20}$ of 1.425 and $d_4^{20}$ of 1.423 for a molecular refraction of 33.4 against 33.5 calculated for $CF_2Br$—$CMe$=$CH$—$CH_3$, 1,1-difluoro-1-bromo-2-methyl-2-butene.

A duplicate experiment was made with double the quantity of alkali and heating to 120° C. gave only a liquid product presumed to be the mono-olefin. Fractionation of this liquid yielded 40 per cent of the mono-olefin accompanied by marked evolution of hydrogen bromide and a gas boiling close to 40° C. The latter was caught in a —70° C. trap during the fractionation. The mono-olefin reacts immediately with alcoholic silver nitrate indicating the presence of an active halogen atom. An allylic shift of the bromine atom followed by thermal dehydrobromination to 1,1-difluoro-isoprene is presumed to have taken place.

*Dehydrobromination of 1,1-difluoro-1-bromo-2-methyl-2-butene.*—The apparatus was the same as in the dehydrochlorination of 1,1-difluoro-1-chloro-2-methyl-2-butene.

About 7 g. of fused anhydrous zinc bromide was placed in the reaction flask. The reaction flask was heated, and over a period of 1.5 hours 17.0 g. of 1,1-difluoro-1-bromo-2-methyl-2-butene was added with stirring. Hydrogen bromide and some hydrogen fluoride were evolved. The liquid collected in the trap (about 2.5 g.) was distilled in a small column consisting of a side-arm test tube packed in the upper two-thirds with glass beads and a layer of soda lime.

With ferric chloride as a catalyst the reaction is violent.

| Fraction | B. P., degrees | $n_D^{25}$ | $d^{25}$ | Weight |
|---|---|---|---|---|
| No. 1 | up to 26 | | | 0.3 |
| No. 2 | 26–40 | 1.338 | | 0.5 |
| No. 3 | 40–1 | 1.335 | 0.90 | 0.8 |
| Residue | | | | 0.5 |

The molecular refraction of Fraction No. 3, 1,1-difluoro-isoprene, is 23.9 (observed), 24.2 (calculated).

EXAMPLE 3

*1,1-difluoro-1,3-butadiene*

*Addition of $CF_2BrCl$ to propylene.*—In a steel bomb of 1220 cc. capacity, at —25° C. were placed 160 g. (0.97 mole) of $CF_2BrCl$ and 17 cc. of 29 per cent acetyl peroxide in dimethyl phthalate. After warming the closed bomb to room temperature propylene was introduced. The bomb was shaken from time to time to facilitate solution of the propylene, and more propylene was added until there was substantially 1 mole present. The bomb was then shaken 24 hours at 60° C. Distillation of the crude product yielded 57.6 g. (32.2%) of 3-bromo-1-chloro-1,1-difluorobutane, $b_{50}=43.5°$, $n_D^{25}=1.4162$, $d^{20}=1.550$. Molecular refraction was 33.7 (found), 33.1 (calculated). Also obtained was a fraction 31.6 g., (15.1%) corresponding to $C_7H_{12}F_2BrCl$ ($CF_2BrCl+2C_3H_6$), $b_{20}=89–90°$, $n_D^{25}=1.4356$, $d^{20}=1.380$. Some $CF_2BrCl$ was recovered unchanged.

The adduct was formed using benzoyl peroxide, as follows: A steel autoclave of 1220-ml. capacity was chilled to the temperature of frozen carbon dioxide, and 500 g. (3.02 moles) of $CF_2BrCl$ and 18.5 g. of benzoyl peroxide were introduced. The autoclave was closed, and gaseous propylene was charged to the autoclave until approximately an equimolecular amount was introduced. The autoclave was then heated at 85° C. with agitation for 20 hours. After cooling the autoclave was opened and the gaseous products were led through a trap chilled with frozen carbon dioxide. 210 g. of unreacted $CF_2BrCl$ and 100 g. of unreacted propylene were recovered. The product was then distilled at atmospheric pressure yielding 113.4 g. of 3-bromo-1-chloro-1,1-difluorobutane boiling at 117–120° C. The distillation residue (66.5 g.) contained higher condensation products of propylene and $CF_2BrCl$ and decomposition products of benzoyl peroxide. The yield based on unrecovered starting material was 31.2 per cent.

*Purification of 3-bromo-1-chloro-1,1-difluorobutane.*—The constant-boiling fractions of the propylene-$CF_2BrCl$ adduct were shaken three times with concentrated sulfuric acid, washed with water and with sodium bicarbonate solution and dried over anhydrous magnesium sulfate. Distillation at atmospheric pressure gave a fraction, B. 117.2–117.3°/737.9 mm., $$n_D^{25}=1.4175$$

$d_4^{25}=1.5737$. Molecular refraction was 33.1 (found), 33.1 (calculated). The liquid formed crystals and remelted below —120° C.

*Dehydrobromination of 3-bromo-1-chloro-1,1-difluorobutane with acid catalyst.*—The apparatus consisted of a small three-neck flask fitted with a glass stirrer, a dropping funnel and a reflux condenser. The effluent from the top of the condenser was passed over the surface of water to absorb hydrogen halide and was passed successively through tubes containing solid sodium hydroxide and calcium chloride to a tube chilled with frozen carbon dioxide.

15 g. (0.072 mole) of 3-bromo-1-chloro-1,1-difluorobutane was heated and with stirring, 5.0 g. of sublimed ferric chloride was added in increments. There was evolved 0.0337 equivalent of hydrogen halide of which 0.0309 equivalent was hydrogen chloride and 0.0028 equivalent was hydrogen bromide. Part of the starting material, but none of the dehydrohalogenation product, was recovered. The reaction was conducted at the boiling point of the starting material. The product resinified under the reaction condition and was not isolated.

*Dehydrobromination of 3-bromo-1-chloro-1,1-difluoro-1-chlorobutane with alkaline reagents.*—The apparatus consisted of a small three-neck flask fitted with a glass stirrer, a dropping funnel and a reflux condenser. A tube from the top of the condenser led to an ice-water trap and a trap for frozen carbon dioxide in series.

A mixture of 10.0 g. (0.25 mol) of sodium hydroxide pellets and 25 cc. of dimethoxytetraglycol were heated in the flask forming a slurry and allowed to cool to room temperature. A mixture of 20.8 g. (0.1 mole) of $CF_2Cl.CH_2.CHBr.CH_3$ and 5 cc. of dimethoxytetraglycol was added with stirring over a period of 70 minutes. The reaction started at room temperature, but the reaction proceeded much more readily at the boiling point of the dimethoxytetraglycol. Air was circulated through the reflux condenser to prevent distillation of any high-boiling material. About 0.3 g. of liquid passed through the ice-water trap and collected in the second trap. About 10 cc. of liquid collected in the ice-water trap. Distillation of the 10 cc. of liquid yielded 7.6 g. of liquid, B.=60–3°, $n_D^{25}=1.3640$, $$d_4^{25}=1.125$$

Molar refraction as a difluorochlorobutene was 25.0 (pound), 24.9 (calculated). The alkaline residue in the flask gave a strong test for bromide ion. Titration of an aliquot with standard silver nitrate solution indicated that 0.111 equivalent of hydrogen halide had been removed from 0.1 mole of starting material.

Similar results were obtained using potassium hydroxide in place of sodium hydroxide and diethylene glycol in place of dimethoxytetraglycol.

The difluorochlorobutene slowly decolorized bromine in carbon tetrachloride and reduced neutral potassium permanganate in acetone. Qualitative analysis by sodium fusion indicated that chlorine and fluorine were present and bromine absent. The compound gave an immediate white precipitate with alcoholic silver nitrate indicating the presence of allylic chlorine. The compound is 1,1-difluoro-1-chloro-2-butene ($CF_2Cl.CH:CH.CH_3$). This structure was proven by oxidation with cold aqueous potassium permanganate. Acetic acid (identified as acetanilide) and monochlorodifluoroacetic acid were formed.

*Dehydrochlorination of 1,1-difluoro-1-chloro-2-butene.*—The apparatus consisted of a small three-neck flask fitted with a glass stirrer, a dropping funnel and a reflux condenser. The effluent from the top of the condenser was passed over the surface of water to absorb hydrogen halide and successively through tubes containing solid sodium hydroxide and calcium chloride to a tube chilled with frozen carbon dioxide.

Three grams of sublimed ferric chloride was placed in the flask. With heating and occasional stirring 8.0 g. of 1.1-difluoro-1-chloro-2-butene (the product obtained in the preceding reaction) was added over a period of half an hour. Hydrogen chloride and possibly some hydrogen fluoride was evolved and was partly collected in the water trap. Some undissolved hydrogen halide was absorbed in the sodium hydroxide tube. The temperature at the top of the reflux condenser never exceeded room temperature (26°). The tube chilled with frozen carbon dioxide contained 2.4 g. of liquid. The boiling point was near 0°. Refractive index $n_D^2$ was 1.338. As estimated by weight and volume measurements density was about 1.0 (slightly heavier than water). Molecular refraction as 1,1-difluoro-1,3-butadiene assuming a density of 1.0 was 18.8 (found), 19.5 (calculated). The yield was 42 per cent.

The dehydrochlorination of 1,1-difluoro-1-chloro-2-butene may also be conveniently carried out by heating with anhydrous ferric chloride in dry carbon tetrachloride.

*Polymerization.*—A one-gram sample of 1,1-difluoro-1,3-butadiene was polymerized in a sealed tube with 3 cc. of distilled water and 1 mg. each of MP-189-S (sulfonated chlorinated hydrocarbons used as emulsifying agent), $K_2S_2O_8$ and $NaH_2PO_4.H_2O$. After 18 hours at 80° C. a single piece of coagulated polymer was found suspended in a clear aqueous solution. The polymer which weighed about 0.2 gram was rubbery and swelled without dissolving in chloroform and in methyl ethyl ketone.

DISCUSSION

The dehydrohalogenation must apparently be carried out in two steps:

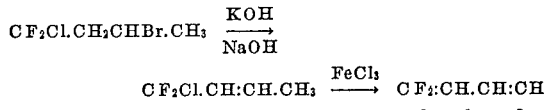

Alkaline agents tend to remove only the elements of hydrobromic acid; acidic salts, such as ferric chloride, tend to remove the elements of hydrochloric acid. Neither type of reagent alone, under the conditions employed, produces any appreciable amount of product with both hydrochloric and hydrobromic acid removed.

Oxidation studies have shown that the double bond in the mono-olefinic dehydrohalogenation products is in the 2-position. For example, the oxidation with cold neutral potassium permanganate solution of the dehydrohalogenation product of 3-bromo-1-chloro-1,1-difluorobutane gave acetic acid and chlorodifluoroacetic acid in good yield. No ketones were formed and no other acids could be found. The isolation of these degradation products indicates that the reaction proceeds primarily as follows:

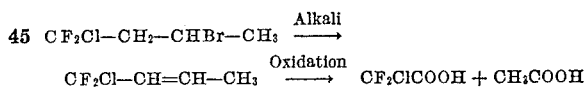

However, it is recognized that relatively small amounts of isomeric materials, such as the product with the double bond in the 3-position, may be present and escaped detection by the oxidation procedure.

The chlorine atom in the $CF_2Cl$ group is more difficult to remove than chlorine in a $CCl_3$ group.

Dimethoxytetraglycol may be replaced by other inert solvents such as, for example, ethylene glycol, diethylene glycol, the Cellosolve and Carbitol solvents and their etherification products. The lower alcohols may be used as solvents, but there is some tendency toward etherification rather than the desired dehydrohalogenation. The reaction may also be carried out with solid alkali in the absence of any solvent.

What we claim is:

1. The process of producing a 1,1-difluoro-1,3-diolefin which comprises dehydrobrominating by an alkaline reagent and thus removing bromine from the 3-carbon atom of a compound having the formula $XCF_2-CHR-CHBr-CH_2R'$ in which X is a halogen of the class consisting of chlorine and bromine, R and R' are each from the class consisting of hydrogen, alkyl and chloroalkyl, and $CH_2R'$ contains at least as many carbon atoms as R but no more than twelve, said alkaline reagent being from the class consisting of alkali metal hydroxides, alkaline earth metal hydroxides, lime and organic bases; and then by acid catalysis dehydrohalogenating to produce the difluoro-diolefin, using in said acid catalysis a catalyst of the class consisting of phosphotungstic acid, phosphomolybdic acid, and salts of strong acids and weak bases.

2. The process of producing 1.1-difluoro-1,3-butadiene from $XCF_2-CH_2-CHBr-CH_3$ in which X is a halogen of the class consisting of chlorine and bromine, which comprises dehydrobrominating by an alkaline reagent to produce 1,1-difluorobutene which is substituted in the 1-position by a halogen of the class consisting of chlorine and bromine, said alkaline reagent being from the class consisting of alkali metal hydroxides, alkaline earth metal hydroxides, lime and organic bases and then by acid catalysis dehydrohalogenating to produce the difluorobutadiene, using in said acid catalysis a catalyst of the class consisting of phosphotungstic acid, phosphomolybdic acid, and salts of strong acids and weak bases.

3. A compound of the formula $$CF_2=CR-CH=CHR'$$

in which R and R' are of the class consisting of hydrogen and alkyl and CHR' contains at least as many carbon atoms as R but no more than twelve.

4. 1,1-difluoro-1,3-butadiene.

5. 1,1-difluoro-isoprene.

6. The process of producing 1,1-difluoro-isoprene which comprises dehydrobrominating by an alkaline reagent 1,1-difluoro-2-methyl-3-bromo-butane substituted in the 1-position by a halogen of the class consisting of chlorine and bromine to obtain a difluoro halogenated butene, said alkaline reagent being from the class consisting of alkali metal hydroxide, alkaline earth metal hydroxide, lime and organic bases, and then dehydrohalogenating the latter by acid catalysis and obtaining 1,1-difluoro-isoprene, using in said acid catalysis a catalyst of the class consisting of phosphotungstic acid, phosphomolybdic acid, and salts of strong acids and weak bases.

References Cited in the file of this patent

UNITED STATES PATENTS

| Number | Name | Date |
| --- | --- | --- |
| 2,410,541 | Joyce | Nov. 5, 1946 |
| 2,468,208 | Kharasch | Apr. 26, 1949 |
| 2,549,580 | Denison et al. | Apr. 17, 1951 |